United States Patent [19]

Barnett et al.

[11] Patent Number: 4,860,974
[45] Date of Patent: Aug. 29, 1989

[54] PAYLOAD DEPLOYMENT METHOD AND SYSTEM

[75] Inventors: Clifford J. Barnett, Costa Mesa; John E. Greenwood, Anaheim; Earl V. Holman, Whittier, all of Calif.

[73] Assignee: United States of America as represented by the Administrator, National Aeronautics and Space Administration, Washington, D.C.

[21] Appl. No.: 182,000

[22] Filed: Apr. 15, 1988

[51] Int. Cl.⁴ ................................................ B64G 1/22
[52] U.S. Cl. ............................ 244/158 R; 244/118.1
[58] Field of Search ........................... 244/158 R–161, 244/118.1, 137.1; 248/2, 3, 5; 206/3, 319; 124/56

[56] References Cited

U.S. PATENT DOCUMENTS

| | | | |
|---|---|---|---|
| 4,079,904 | 3/1978 | Groskopfs et al. | 244/158 |
| 4,082,240 | 4/1978 | Heathmon et al. | 244/158 R |
| 4,324,374 | 4/1982 | Wittmann et al. | 244/158 R |
| 4,359,201 | 11/1982 | Thomson et al. | 244/158 R |
| 4,554,905 | 11/1985 | Smyly et al. | 124/56 |
| 4,618,112 | 10/1986 | Keigler | 244/158 R |

Primary Examiner—Galen L. Barefoot
Attorney, Agent, or Firm—Russell E. Schlorff; John R. Manning; Edward K. Fein

[57] ABSTRACT

A method and apparatus for deploying the payload of space shuttle craft or the like. The payload rotated about an axis outside of the payload but approximately longitudinally of the cargo bay of the shuttle craft. The payload may thus be rotated, through ninety degrees. In this case, that is in its rotated position, the payload may or may not have a small portion located within the cargo bay. Alternatively, the payload may be located completely outside of the bay. According to the apparatus two separable hinge-like devices connect at one longitudinal side or edge of the payload to respective ones of the payload trunnions at different longitudinally spaced locations along the length of the payload. Separation of the payload from the cargo bay is made unlatching a latch and by the use of a repulsion spring at the position of each hinge-like device. Two four-link mechanisms allow movement between payload and bay. Such accoommodative movement is required especially during launch when considerable vibration is encountered.

3 Claims, 3 Drawing Sheets

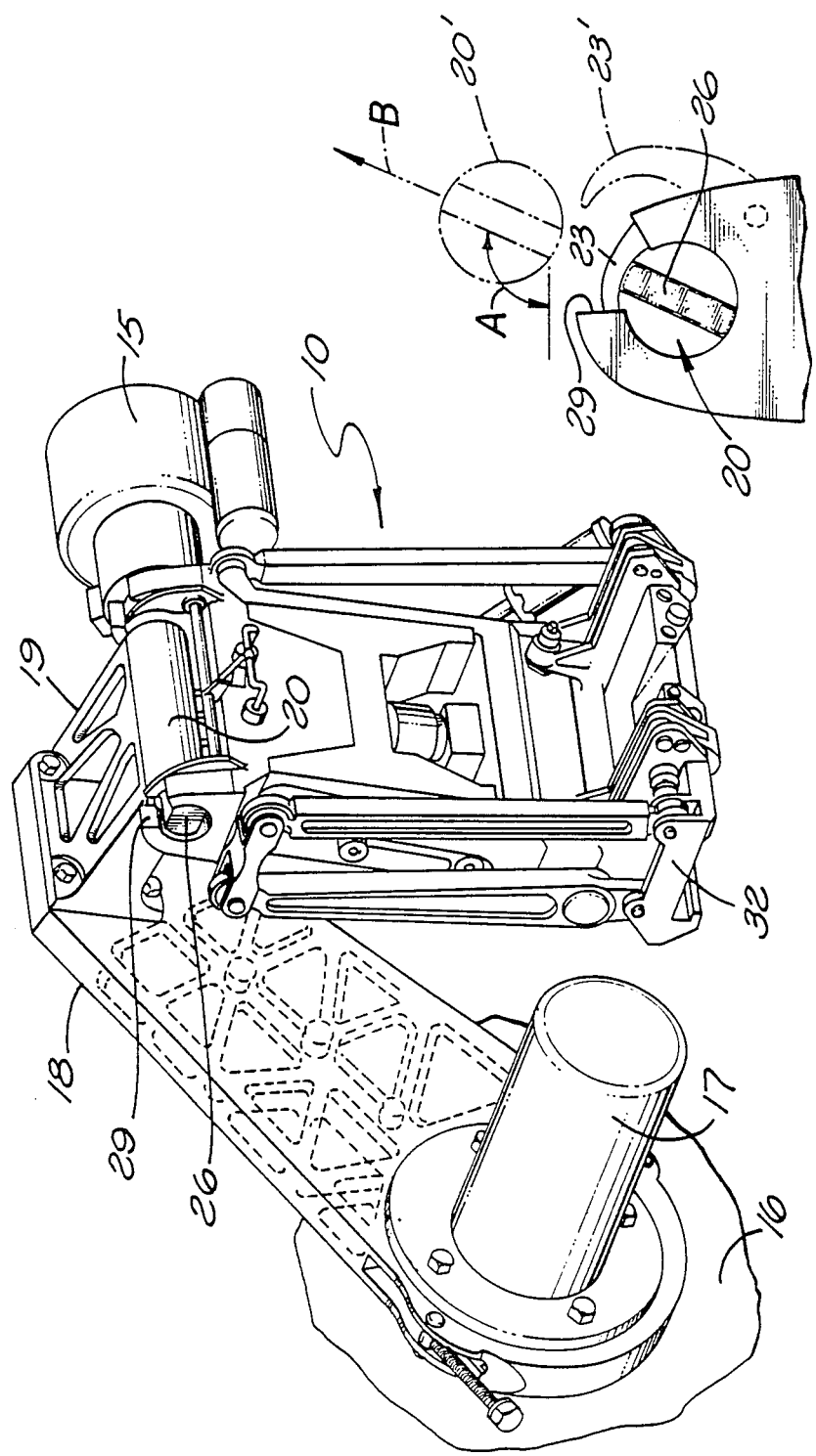

PAYLOAD DEPLOYMENT METHOD AND SYSTEM

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 U.S.C. 2457).

BACKGROUND OF THE INVENTION

1. Field of the Invention

This invention relates to the art of maneuvering a payload within and without a payload bay, and more particularly to a stabilized payload deployment system and to a method and an apparatus for carefully and for safely handling a payload in or near the cargo bay of an orbiter.

2. Background Art

In the field of the present invention it has been known to eject a payload from an orbiter cargo bay in a manner such that the payload is left with some small lingering momentum before it has been fully deployed. This can be hazardous when the payload has not cleared that portion of the orbiter structure defining the cargo bay. In other words, the payload can collide with the orbiter.

In the prior art, the payload has been maneuvered from a location inside the cargo bay to a location outside thereof. This is done largely by imparting some momentum to the payload and letting the payload "coast" as an essentially weightless body from within to without the bay. This is risky because the payloads while moving inside the bay, can collide with the orbiter. Note will be taken that the orbiter has a ponderous mass. Further, even the payload may also have a rather ponderous mass. The sizes of these masses thus make considerable damage possible should there be a collision.

U.S. Pat. No. 4,079,904 discloses an extendable rack for exchanging small modules within a payload by utilizing a manipulator arm.

U.S. Pat. No. 4,324,374 discloses payload ejection from a shuttle by means of a cradle (col. 3, lines 6-12 and 47-52).

U.S. Pat. No. 4,359,201 discloses "a payload such as a spacecraft" which is deployed from a launch vehicle with linear and angular velocity (abstract).

U.S. Pat. No. 4,618,112 discloses a payload ejection system for rotating the same (abstract).

U.S. Pat. No. 4,554,905 discloses a space shuttle orbiter having apparatus for spinning and propelling probes or satellites from a payload bay (col. 1, lines 44-48 and col. 2, lines 35-43).

SUMMARY OF THE INVENTION

The method and apparatus of the present invention solve the above-mentioned problems of the prior art by rotating a payload in the cargo bay of a shuttle craft from a position within the shuttle craft to a position outside the cargo bay. Movement of the payload is thus everywhere carefully and safely guided so that it is always in spaced relation to the cargo bay. When the payload reaches its position essentially outside the cargo bay, the payload is moved away from the shuttle craft.

It is a feature of the present invention that the payload is safely outside the cargo bay before it is separated from the shuttle craft. This makes it possible, therefore, to prevent the payload from colliding with the shuttle craft. The separation of the payload from the shuttle craft is thus less hazardous. That is, the payload will not as likely collide with the shuttle craft during its deployment because separation is safely accomplished while the payload is completely outside of the shuttle craft. As stated previously the payload is guided during movement before separation, and it is nearly free or completely free of the shuttle craft structure defining the cargo bay.

Due to the fact that payload maneuvers are performed in space, the present invention may be constructed of apparatus having a small mass. This is an advantage in that some of the thrust and energy required for launch is saved.

Another feature of the invention is that a latch for each of four payload trunnions is engaged to fix the payload relative to the shuttle craft before launch. The apparatus of the invention is thus not required for use until after all the shuttle craft is in space. In retrospect this feature may seem natural, but it is not. The apparatus of the invention is used only in space and, in this case, the payload is essentially weightless. Thus, the large force vector of payload weight does not heavily load the inventive apparatus and its structure can be made small with a low launch weight.

It is also an advantage of the present invention that the structure thereof allows some vibration and/or movement of the payload during launch.

Other advantages will be apparent from the description which follows, in conjunction with the accompanying drawings and claims.

BRIEF DESCRIPTION OF THE DRAWING

FIG. 4 is a perspective view of the other side of the structure shown in FIG. 2 with its attachment to a payload trunnion.

FIG. 5 is an end elevational view of a yoke and latches which release a payload to space.

DETAILED DESCRIPTION OF THE PREFERRED EMBODIMENT

Figure 1:
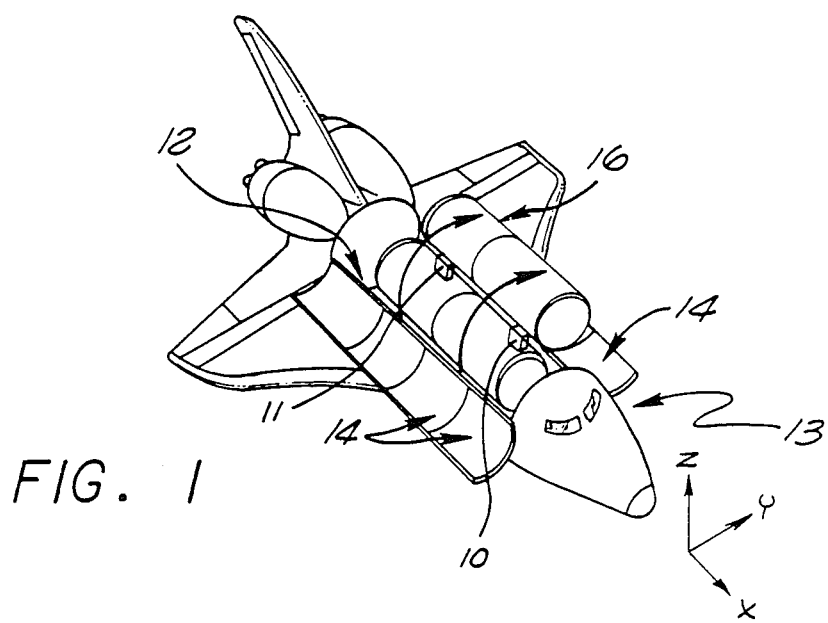
FIG. 1 is a perspective view of a shuttle craft on which the present invention may be employed, the cargo bay thereof being exposed by open bay doors.

As shown in FIG. 1, the system of the present invention has forward and aft parts 10 and 11, for mounting in fixed positions within a cargo bay 12 of a shuttle craft 13. Payload deployment begins by opening cargo bay doors 14. No payload is shown in cargo bay 12 in FIG. 1.

Each of the forward and aft parts 10 and 11, respectively, may be identical to each other. Thus only forward part 10 will be described in detail. Part 11, however, is preferably different from part 10, but only by the absence of a rotary drive unit (motor) 15 shown in FIG. 2.

Figure 2:
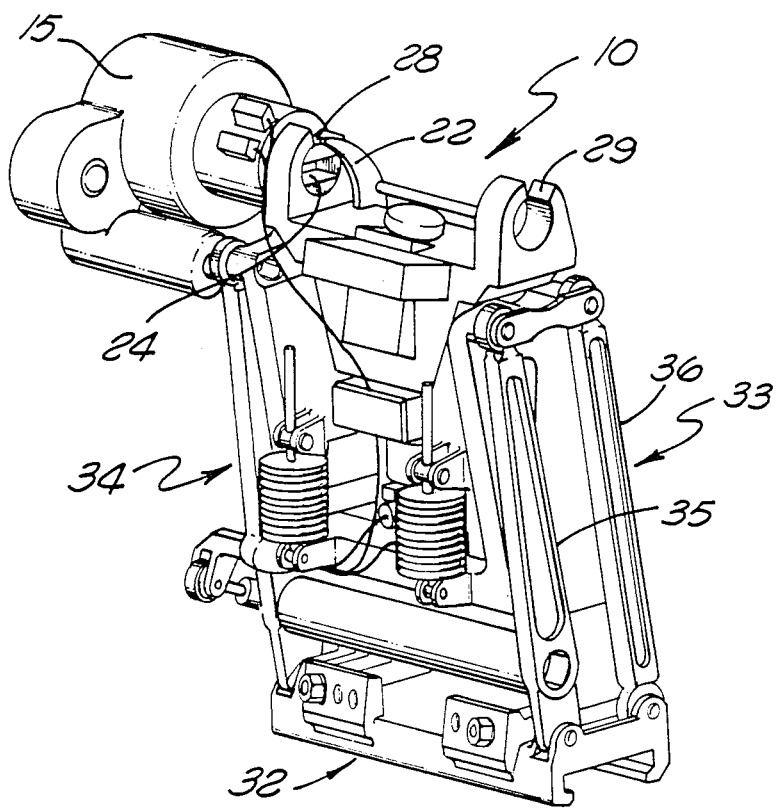
FIG. 2 is a perspective view of one side of a portion of the structure of the present invention.

The view of FIG. 2, in general, looks away from a payload (not shown in FIG. 2, but shown at 16 in FIG. 4).

Figure 3:
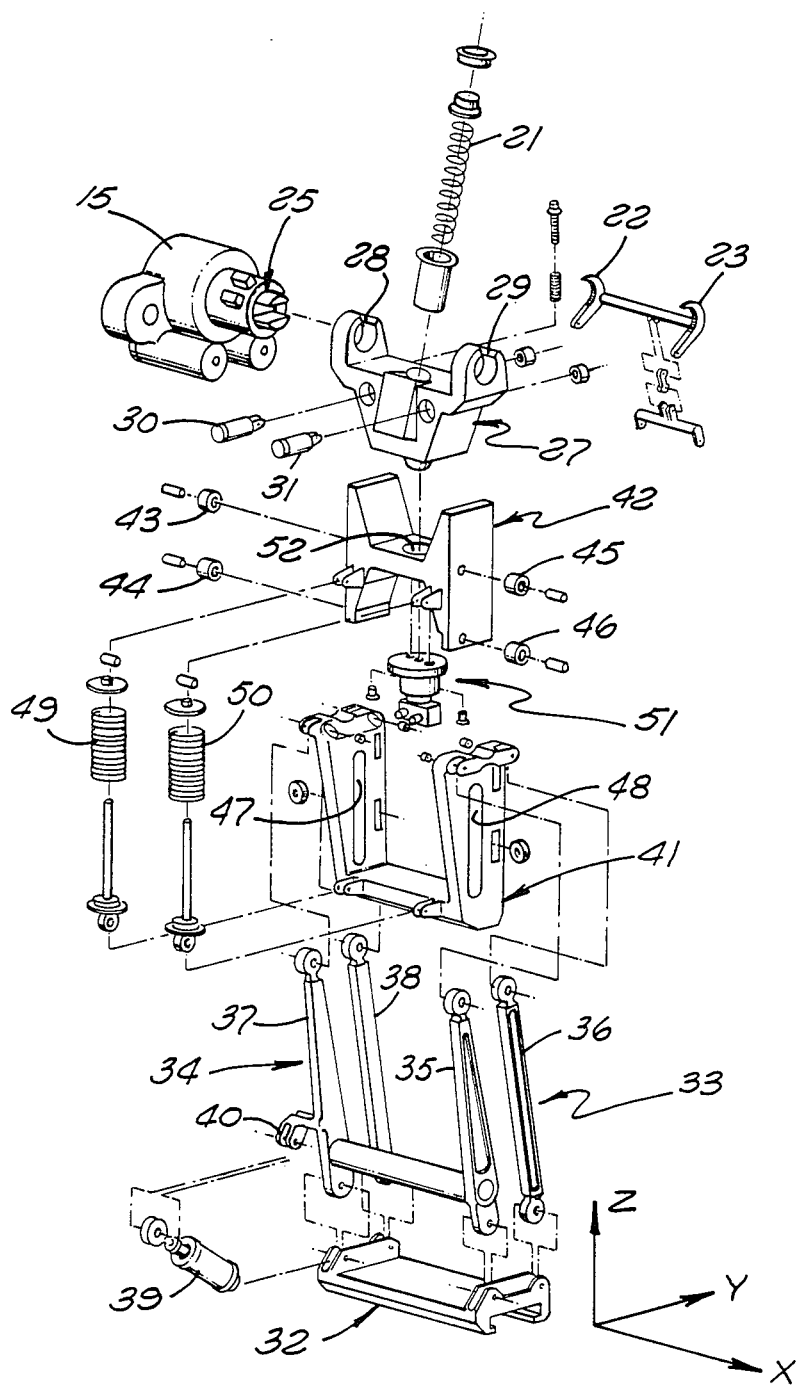
FIG. 3 is an exploded perspective view of the structure of the present invention shown in FIG. 2.

It is conventional to define reference axes x, y and z as those shown in FIG. 3. If the more or less symmetrical plane through shuttle craft 13 is vertical, the z axis would be vertical in that vertical plane. The y axis is then abeam (outbound and normal to the z axis). The x axis extends from aft to forward and intersects both of the z and y axes.

A brief review of all the drawings will quickly reveal how, in general, the payload 16 is deployed. Payload 16 as shown in FIG. 4 has four trunnions fixed thereto, one of which is shown at 17 in FIG. 4. A support plate 18 is fixed to trunnion 17. A support plate 19 is fixed to support plate 18. A shaft 20 is fixed to support plate 19.

Motor 15 turns shaft 20 and every structure fixed relative to shaft 20 including payload 16 about the axis of shaft 20. Thus, shaft 20 may be rotated through an angle A in FIG. 5. The angle A may be, for example, 104.3 degrees. Due to the fact that shaft 20 is fixed relative to payload 16, they both turn together. For example, if payload 16 has a cylindrical surface and is turned 90 degrees about a longitudinal axis approximately in that cylindrical surface and parallel to the x axis, the payload 16 might lodge completely outside of cargo bay 12.

When payload 16 is in the 90 or so degree position and is ready for ejection, the force for ejection bears upon shaft 20 and the shaft corresponding to shaft 20 in part II (FIG. 1). This force, in the case of shaft 20 is the force supplied by repulsion spring 21 (FIG. 3). However, shaft 20 and its corresponding shaft in part 11 rotate, but cannot otherwise move until they are released. Movement of shaft 20 is limited to rotary movement about its symmetrical axis until hooks 22 and 23 (FIG. 3) are moved to the right (FIG. 5). This allows compression spring 21 to urge shaft 20 to the dotted line position 20 shown in FIG. 5. If the force of spring 21 acts in the direction of arrow B in FIG. 5, this force may act substantially through the center of mass of payload 16 if desired.

Shaft 20 has an appendage, i.e. a key, at the same angular position at each end thereof. Both appendages may be identical, if desired. One fits in a keyway 24 of motor output shaft 25. The other key 26 is shown in FIG. 4. Key 26 simply rotates in a yoke 27 that has slots 28 and 29 for the appendages of shaft 20 to pass through when aligned with these slots.

The system of the present invention is electromechanical in nature. Further, the system of the present invention needs somewhat less than double the equipment shown in FIG. 2 to operate properly. The system of the present invention is thus light in weight. It requires no electrical equipment other than motor 15 and two solenoid actuators 30 and 31 to move hooks 22 and 23 from a latched position to an unlatched position. (See hook 23, FIG. 3). The system of the present invention thus provides safe and careful guiding of payload 16 in the yoke in each of parts 10 and 11. The present invention, however, permits payload deployment of a large and heavy payload.

The system of the invention provides a mechanism to rotate, to guide and to expel automatically a payload into a pre-selected path, and at a predetermined velocity appropriate to the nature of the payload. Each of the parts 10 and 11 (FIGS. 1 and 2) have a mounting fitting. A mounting fitting 32 for part 10 is shown in FIGS. 2, 3 and 4. Mounting fitting 32 is fixed to a longeron (not shown) of shuttle craft 13. The longeron is located within the cargo bay 12. The system of the present invention provides apparatus to remove payload 16 from cargo bay 12 via an obstruction free rotational path.

It is a feature of the system of the present invention that the axis about which payload 16 rotates can be offset in prescribed amounts of y and z displacements as necessitated by clearance requirements when coming out of cargo bay 12.

In cargo bay 12, parts 10 and 11 each include two four-link mechanisms. (See mechanisms 33 and 34 in FIG. 3.) Mounting fitting 32 provides a fixed link for each of the mechanisms 33 and 34. Links 35, 36, 37 and 38 are always parallel to each other. An outboard biasing spring cartridge 39 urges mechanisms 33 and 34 to rotate clockwise as viewed from the right in FIG. 3, the same being connected from mounting fitting 32 to a clevis 40 on link 37.

The upper ends of links 35–38 are pinned to the outside of a cradle 41 at the top. A floating head 42 slides vertically inside cradle 41. Head 42 has roller bearings 43, 44, 45 and 46. Roller bearings 43 and 44 ride in a cradle slot 47. Roller bearings 45 and 46 ride in a cradle slot 48.

Compression springs 49 and 50 are connected between head 42 and cradle 41.

The four link mechanisms 33 and 34 produce the necessary y-displacement of cradle 41 as required for keel trunnion clearance.

Head 42 moves in translation in the z direction within cradle slots 47 and 48. This displacement is also required for keel trunnion clearance.

Yoke 27 is a fail-safe separable yoke which utilizes a conventional pyro separation system 51.

At the time of initial installation of payload 16 into cargo bay 12, head 42 is driven downward in slots 47 and 48 of cradle 41. At the same time, the two spring systems (springs 39, 49 and 50) are put in their loaded conditions. Springs 49 and 50 are placed under compression first. Outboard biasing spring cartridge 39 actually may incorporate a Belleville spring assembly.

Operation shuttle craft 13 is on the ground, payload 16 is fixed to shuttle craft 13 inside cargo bay 12. Shuttle craft 13 has four conventional latches (not shown) that can clamp and can unclamp trunnion 17 and three other trunnions of substantially the same construction in fixed positions relative to shuttle craft 13. When the trunnions are so clamped, springs 49 and 50 Will be compressed about two inches. The deployment of payload 16 then is accomplished with the following steps (after shuttle craft 13 has been propelled to a position in space):

1. All of the trunnion latches are operated to unclamp them from the four trunnions.
2. Contemporaneously with the unclamping of the latches, springs 49 and 50 lift the payload 16 about two inches.
3. Motor 15 is then turned on. It rotates both payload 16 and shaft 20 about the axis of shaft 20.
4. Solenoid actuators 30 and 31 are energized to remove hooks 22 and 23 from around shaft 20.
5. Repulsion spring 21 pushes off shaft 20 and payload 16 into space.
6. Pyro separation system 51 is left undisturbed unless there is a failure to perform one or more of steps 1 through 5 above.
7. If system 51 is fired, it will blow off yoke 27 and all structures fixed relative thereto including payload 16.

When the payload 16 receives its release from the latches and conventional longeron and keel retention fittings, the springs at 39, 49 and 50 are free to exert a compressive force upon the head 42 displacing it in the z direction along the slots 47 and 48 of the cradle 41. At the same time, the outboard biasing spring cartridge 39 exerts its tensional force between clevis 40 and the mounting fitting 32. The rotational effect of the linkage produces the required y direction displacement of the head 42.

A resultant and two-inch z displacement and a three-inch y displacement may thus be achieved. These are sometimes the offsets required for clearance of the payload's keel trunnion relative to the keel fitting prior to the start of the rotational withdrawal of the payload 16 out of the cargo bay 12.

Perhaps a desirable feature includes the pyro separation system, which connects to the yoke 27 via a circular aperture 52 in the head 42. Thus, in the event of a failure of the unclamping of the latches, the pyro separation system can be commanded to expel the payload 16 with the plane of separation occurring between the pyro system housing. The only additional mass carried by the expelled payload 16, beyond that of a conventional payload spring release, will be that of the yoke 27.

The present invention can be used for all payloads and is not restricted to those payloads which are mounted in a cradle assembly.

While a single embodiment of the invention has been described, variations thereof can be made without departing from the teaching of the invention. Therefore, it is intended that the scope of the invention be defined only by the claims which follow.

I claim:

1. In a space shuttle or orbiter type craft having a cargo bay and a payload mounted within the cargo bay, the payload having first and second trunnions fixed thereto at two points spaced along the length thereof, an x axis extending longitudinally forward of the shuttle craft, a y axis extending abeam through the x axis, a z axis extending vertically in a position intersecting the x and y axes, said two points lying on a predetermined line substantially parallel to the x axis, the combination comprising:

first and second support means fixed relative to said first and second trunnions, respectively;

first and second shafts fixed relative to said first and second support means, respectively;

a motor fixed relative to said space shuttle, said motor having an output shaft keyed to said first shaft, said motor being energizable to rotate said payload from within to without said cargo bay;

first and second yokes positionable around said first and second shafts respectively when said payload lies within said cargo bay, said first and second shafts being rotatable in said respective first and second yokes;

first and second latches actuatable to hold said first and second shafts within said first and second yokes, respectively;

said first and second latches being deactuatable to release said first and second shafts, respectively, to release said first and second support means, and to release said payload from said space shuttle;

first and second mounting fittings fixed relative said shuttle craft; and first and second means connected from said first and second yokes, respectively, to yieldably support said yokes on said first and second mounting fittings, respectively.

2. The combination as set forth in claim 1, wherein said first and second yokes have respective first and second repulsion springs to urge said payload toward a deployed position spaced from said shuttle craft when said latches are deactuated by disengaging said first and second shafts, respectively.

3. The combination as set forth in claim 2, wherein each of said means includes two parallel four-link mechanisms, a cradle guide fitting and a floating head support fitting; four links being always parallel in each mechanism and pivoted at one end to a corresponding mounting fitting, said links being pivoted at the opposite end to said cradle guide fitting, each of said cradle guide fittings being U-shaped and having two vertical slots therethrough, said floating head support fitting having two roller bearings in each of said vertical slots, a pair of compression springs to support said floating head support fittings on each corresponding cradle guide, and a spring cartridge to bias each pair of mechanism corresponding to one means in the direction of said y axis.

* * * * *